(12) United States Patent
Konnik (10) Patent No.: US 7,339,115 B2
(45) Date of Patent: *Mar. 4, 2008

(54) FIRE RESISTANT ELECTRICAL CABLE SPLICE

(75) Inventor: Robert Konnik, South Windsor, CT (US)

(73) Assignee: Rockbestos Surprenant Cable Corp, East Granby, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/183,129

(22) Filed: Jul. 15, 2005

(65) Prior Publication Data

US 2007/0012470 A1 Jan. 18, 2007

(51) Int. Cl.
*H02G 3/06* (2006.01)
(52) U.S. Cl. .................. 174/88 R; 174/93
(58) Field of Classification Search .......... 174/88 R, 174/93
See application file for complete search history.

(56) References Cited

U.S. PATENT DOCUMENTS

| | | | |
|---|---|---|---|
| 3,576,940 A * | 5/1971 | Stone et al. ............ 174/113 R |
| 3,782,677 A | 1/1974 | Gelfand | |
| 3,878,317 A | 4/1975 | Plaskon | |
| 3,912,854 A | 10/1975 | Thompson et al. | |
| 4,018,983 A | 4/1977 | Pedlow | |
| 4,020,546 A | 5/1977 | May | |
| 4,361,721 A | 11/1982 | Massey | |
| 4,368,452 A | 1/1983 | Kerr, Jr. | |
| 4,555,588 A | 11/1985 | DuPont | |
| 4,663,504 A | 5/1987 | Barkan | |
| 4,668,038 A | 5/1987 | Burnett et al. | |
| 4,976,796 A | 12/1990 | Feitzelmayer | |
| 5,051,290 A | 9/1991 | Stober et al. | |
| 5,091,608 A | 2/1992 | Gunther | |
| 5,183,079 A | 2/1993 | Blin ..................... 138/110 |
| 5,208,428 A | 5/1993 | Foss | |
| 5,258,578 A | 11/1993 | Smith et al. | |
| 5,502,280 A | 3/1996 | Rocci et al. | |
| 5,567,914 A | 10/1996 | Minarovic et al. | |
| 5,753,854 A | 5/1998 | Rickards et al. | |
| 5,753,861 A | 5/1998 | Hansen et al. | |
| 5,801,332 A | 9/1998 | Berger et al. | |
| 6,242,700 B1 | 6/2001 | Smith | |

(Continued)

FOREIGN PATENT DOCUMENTS

JP 2000-350347 12/2000

OTHER PUBLICATIONS

Underwriters Laboratories Inc., UL Standard "Safety for Rapid RIse Fire Tests of Protection Materials for Structural Steel",UL 1709, Second Edition, reprinted May 21, 1998.*

*Primary Examiner*—Chau N. Nguyen
(74) *Attorney, Agent, or Firm*—Hayes Soloway PC (57) ABSTRACT

The fire resistant electrical cable splice joins two electrical cables. The two electrical cables are joined by at least one connection. The connection is formed between at least two conductors, at least one conductor from each of the electrical cables. The connection connects the conductors mechanically and electrically. An insulating polymer, which is electrically nonconductive at temperatures normally associated with the presence of a fire, is substantially applied over the connection. The insulating polymer may be a ceramifiable silicone rubber.

12 Claims, 6 Drawing Sheets

U.S. PATENT DOCUMENTS 6,284,977 B1    9/2001  Boron et al.
6,387,518 B1 *  5/2002  Wolfer et al. ............... 428/447

2004/0118591 A1 *  6/2004  Bufanda et al. ........ 174/106 R

* cited by examiner

FIRE RESISTANT ELECTRICAL CABLE SPLICE

FIELD OF THE INVENTION

The present invention is in the field of electrical cable. More specifically, the present invention is in the field of fire resistant electrical cable.

BACKGROUND OF THE INVENTION

The availability of electrical devices during fires can have lifesaving implications. Exit signs and emergency lights help light where to go in an emergency. Hard-wired fire alarms alert people to an emergency situation. In hospitals and nursing homes, electricity is needed to power devices that are directly in use to sustain life. For these and other reasons, government regulations in numerous countries now specify that essential electrical circuits be protected in order to ensure that the electrical system maintain an operating condition during a fire to ensure the safety of persons inside the building and also to permit fire-fighting personnel to be more efficient in controlling and extinguishing fires. For example, in certain locations, such as high-rise buildings, a minimum amount of time is required for fire alarms to sound and flash so that all persons are alerted. Therefore, the electrical system during the fire must remain intact at least during such critical periods to allow the electrical fire alarms to continue in operation.

Along such lines, it has been established that some essential electrical circuits must be capable of operating for at least one hour, and in some other cases two hours or more to ensure safety of people. As noted, such systems include fire alarm systems, and may also include telephone systems, lighting systems, elevator systems, ventilation systems, water pumps, and other electrically powered lifesaving systems. It may also include voice systems to allow communication during a fire for evacuation of personnel or to allow fire fighters to talk to one another during a fire. Other essential circuits include control and power circuits for fireman's elevators and those fans and dampers which evacuate smoke or shut off smoke leaking into other areas. In addition, automatic door locks, emergency lighting, generators, fire pumps, strobes, smoke detectors, etc., may also similarly require appropriate insulation so that they will remain functional a minimum period of time in a fire situation.

Presently, non fire-rated electrical wires are at risk in a fire-related emergency. Non fire-rated wiring is not designed to sustain operation at high temperatures. Non fire-rated wiring insulation will quickly degrade in a high temperature environment as may exist in a fire.

Several types of fire-rated electrical cables are currently manufactured in a variety of ways. However, all of these fire-rated electrical cables are limited in that splicing the electrical cables in the field (a location where the wiring is performed) negates the fire rating. More simply, splicing technology has not been developed that reliably prevents a fire-rated electrical cable from breaking down at the splice in a high temperature environment. As a result, safety code prohibits fire-rated electrical cables from being spliced in the field. This code limitation often forces electrical contractors to run hundreds of feet of electrical cable without interruption. Non-rated electrical cables, in contrast, often have long runs interrupted by splices in junction boxes to make pulling the wire less difficult. Pulling long runs of fire-rated electrical cable is more labor intensive and, if performed improperly, can lead to damaging the fire-rated electrical cables. In some situations, fire-rated electrical cables are needed in lengths exceeding normal manufacture, which requires custom manufacturing of a fire-rated electrical cable. Non-rated electrical cables do not have the same problem because of the option to splice together multiple sections of electrical cable. It would be advantageous to device a method of splicing a fire-rated electrical cable that would not impinge on the rating of the fire-rated electrical cable.

In fact, currently no fire-rated electrical cable is approved for field splicing. Splicing involves making a connection between two electrical cables. Splicing requires the electricians to tear back the insulation of the electrical cable, electrically connect the conductors, and apply insulation and a jacket to the spliced area. Splicing Mineral Insulated ("MI") electrical cable can only be performed at factories because of the complex nature of splicing mineral insulated electrical cable. A fire-rated electrical cable that could be spliced in the field would reduce costs for installing fire-rated electrical cables.

An important performance characteristic of a fire-rated electrical cable structure is its ability, in general, to withstand temperatures in the neighborhood of 1850° F. for about a two hour duration and subsequent water spray exposure with mechanical vibration resulting from the water spray. Pursuant to the fire-rated electrical cable requirements of UL 2196, for instance, a fire-rated electrical cable structure should provide a functional circuit throughout the required fire testing period of exposure. UL 2196 provides a test method to monitor electrical cable circuit integrity with the ASTM E 119 temperature profile, which gradually raises the temperature to 1000° F. at 5 minutes into the test, to 1700° F. at 1 hour, and 1850° F. at 2 hours. In addition, UL 2196 provides a mandatory "hose stream test" which is conducted on the fire test sample within 3 minutes after the fire test. Two levels of hose stream exposures are defined. Application of the lesser impact hose stream test is limited to fire alarm electrical cable. Fire alarm electrical cable must also comply with Article 760 of the National Electric Code, whose requirements are also incorporated herein by reference.

Thus, a heretofore unaddressed need exists in the industry to address the aforementioned deficiencies and inadequacies.

SUMMARY OF THE INVENTION

Embodiments of the present invention provide a system and method for using a fire resistant electrical cable splice. Briefly described in architecture, one embodiment of the system, among others, can be implemented as follows. The fire resistant electrical cable splice joins two electrical cables. The two electrical cables are joined by at least one connection. The connection is formed between at least one conductor from each of the electrical cables. The connection connects the conductors mechanically and electrically. An insulating polymer that is electrically nonconductive at the fire temperatures is substantially applied over the connection. The insulating polymer may be ceramifiable.

In another aspect, the invention features a method for splicing an electrical cable. The method includes the steps of: removing insulation from a first conductor at a first end of a first electrical cable and a second conductor at a second end of a second electrical cable for connection; mechanically and electrically joining the first conductor and the second conductor to form a connection; and applying an insulating polymer substantially over the connection.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
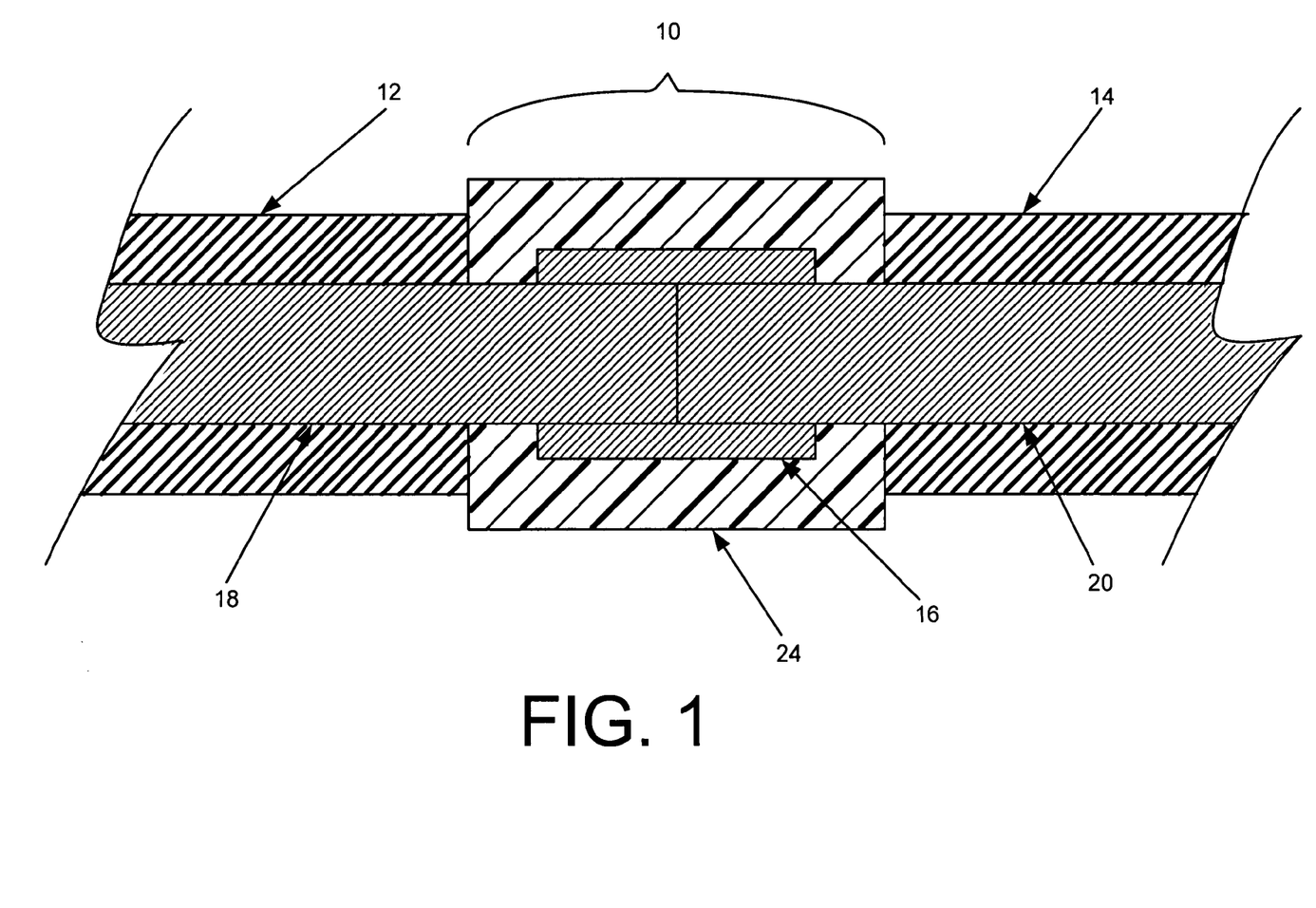
FIG. 1 is a cross-sectional view of two electrical cables connected by a fire resistant electrical cable splice, in accordance with a first exemplary embodiment of the invention.

FIG. 1 is a cross-sectional view of two electrical cables 12, 14 connected by a fire resistant electrical cable splice 10, in accordance with a first exemplary embodiment of the invention. The two electrical cables 12, 14 are joined by at least one connection 16. The connection 16 is formed by at least one conductor 18, 20 from each of the electrical cables 12, 14, which are connected mechanically and electrically. An insulating polymer 24 is substantially applied over the connection 16. The insulating polymer 24 should be electrically nonconductive at temperatures consistent with the presence of a fire.

It is anticipated that the electrical cables 12, 14 will be fire resistant electrical cables, although the fire resistant electrical cable splice 10 may be used for other types of electrical cables. If fire resistant, the electrical cables 12, 14, for instance, may be mineral insulated electrical cables, polymeric ceramifiable electrical cables, or other fire-rated electrical cables. The electrical cables 12, 14 may also be other types of fire resistant electrical cables known to those having ordinary skill in the art.

The conductors 18, 20 can be constructed in a variety of ways. The conductors 18, 20 may be single solid wires or may be multiple wires bundled together. Each electrical cable 12, 14 may also include multiple conductors (only single conductors 18, 20 are shown), which may necessitate a separate connection 16 for each conductor 18, 20. The conductors 18, 20 may include one or more copper wires. The conductors 18, 20 may, as an example, include a conductor with oxygen-free high-conductivity copper, or may be solid copper, 27% nickel clad copper, solid nickel, or another similar conductive material. The conductors 18, 20 can also be made of dissimilar materials. The preferred characteristics of the conductors 18, 20 are that they are electrically conductive and maintain integrity at high temperatures, such as at 1850° F.

One insulating polymer that is electrically nonconductive at temperatures up to 1850° F. is a tape made of silicone rubber such as 3M Scotch 70 or equivalent silicone rubber tape. The 3M Scotch 70 is motor lead tape. That is, 3M Scotch 70 is normally used when making connections between motors and conductors. This 3M Scotch 70 or equivalent silicone rubber tape forms an electrically nonconductive ash when burned. This ash may be structurally stable in a fire depending on the amount of vibration and thermal expansion. A jacketing tape such as 3M Scotch 69 glass cloth tape or equivalent will harden in a fire to provide structural protection from vibration (such as from a hose stream from a fire hose) or from thermal expansion.

Testing performed while developing the invention has suggested that silicone rubber tape may remain effective as a splice electrical insulator at high temperatures for significant periods of time. Specifically, the silicone rubber tape, used for a splice as described herein, has passed the UL 2196 test described herein in standard 120-volt applications for two hours. The silicone rubber tape has also passed a similar test for standard 480-volt applications for one hour. The basic silicone rubber tape has been unable to pass the UL 2196 test in standard 480-volt applications over two hours.

The insulating polymer 24 may be one of many heat resistant polymers known to those having ordinary skill in the art. For example, besides the aforementioned silicone rubber tape, the insulating polymer 24 may be the ceramifiable polymer described in U.S. Pat. No. 6,387,518. The insulating polymer 24 may be a ceramifiable silicon rubber. The insulating polymer 24 may be, for example, applied to the connection 16 in a tape form or using a pliable block. One characteristic of ceramifiable polymers is that they ceramify under heat. The ceramifiable polymer, for instance, may begin to ceramify at a temperature of approximately between 600° F. and 900° F. The ceramifiable polymer may, for instance, begin to ceramify at a temperature below 950° F. As the ceramifiable polymer ceramifies, it changes from a flexible, rubber-like material to a more solid, ceramic-like material. As the ceramifiable polymer ceramifies, dependant upon how quickly it is heated, it may expand. If the ceramifiable polymer is heated too rapidly to significant temperatures, the ceramifiable polymer may expand too quickly, causing it to crack and otherwise degrade its integrity. Unlike the basic silicone rubber tape, the ceramifiable silicone rubber tape is able to pass the UL 2196 test in standard 480-volt applications over two hours as used herein.

Figure 2:
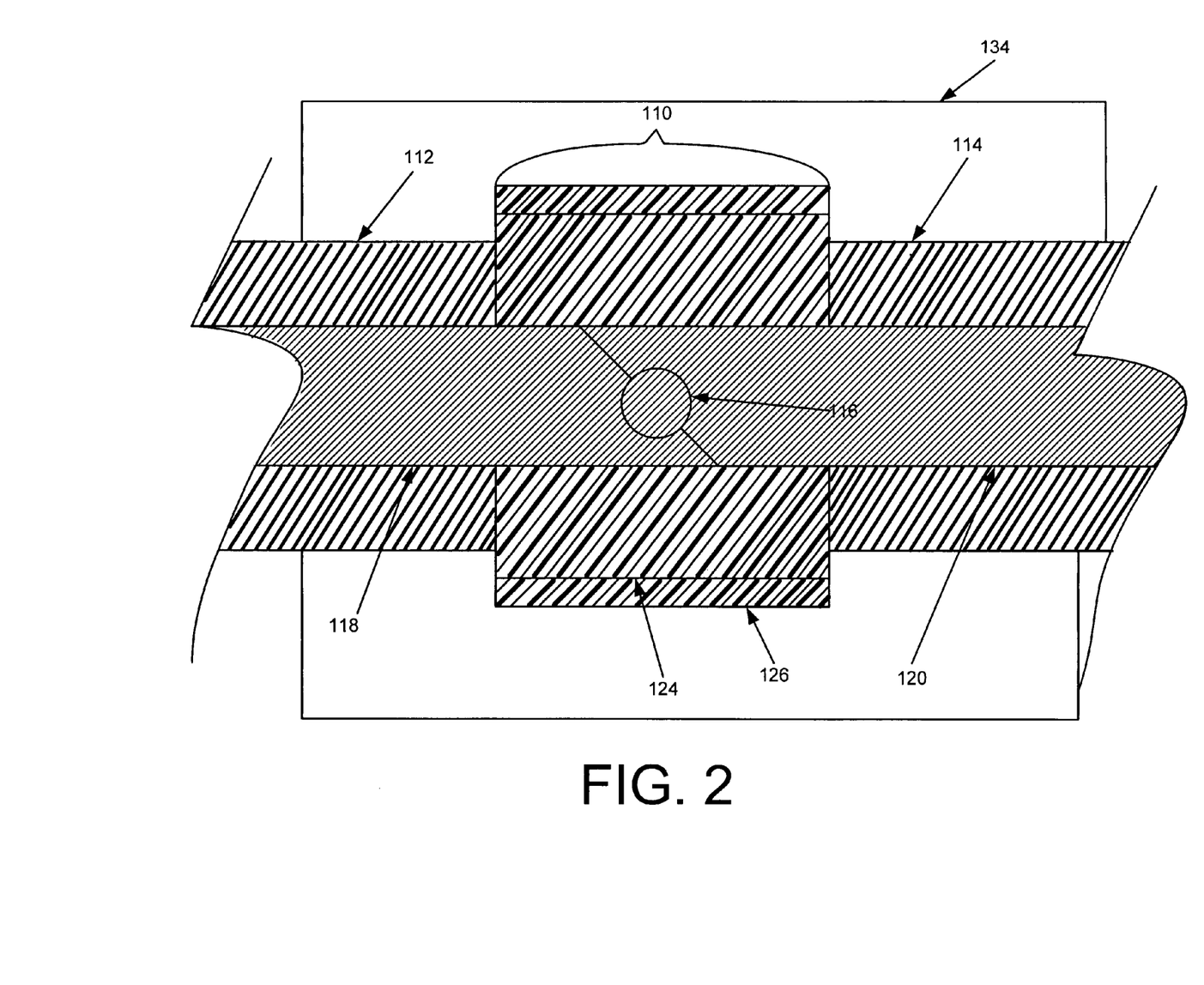
FIG. 2 is a cross-sectional view of two electrical cables connected by a fire resistant electrical cable splice, in accordance with a second exemplary embodiment of the invention.

FIG. 2 is a cross-sectional view of two electrical cables 112, 114 connected by a fire resistant electrical cable splice 110, in accordance with a second exemplary embodiment of the invention. The two electrical cables 112, 114 are joined by at least one connection 116. The connection 116 is formed by at least one conductor 118, 120 from each of the electrical cables 112, 114, which are connected mechanically and electrically. A ceramifiable polymer 124 is substantially applied over the connection 16. A retaining jacket 126 is substantially applied over the ceramifiable polymer 124.

The retaining jacket 126 may be provided to protect the integrity of the ceramifiable polymer 124. If the ceramifiable polymer 124 is heated too rapidly to significant temperatures, the ceramifiable polymer 124 may expand too quickly, causing it to crack and otherwise degrade its integrity. The retaining jacket 126 may be provided to restrain or inhibit the expansion of the ceramifiable polymer 124. By inhibiting the expansion of the ceramifiable polymer 124, the retaining jacket 126 reduces the chances of the ceramifiable polymer 124 degrading its integrity by expanding. The retaining jacket 126 may be, for example, something as simple as non-flammable tape such as 3M Scotch 69 glass cloth tape or equivalent. The retaining jacket 126 may also be joined to the ceramifiable polymer 124 during fabrication, such as in the fabrication of a dual layer heat shrink tube, cold shrink tube, or premolded splice in which an inner layer is the ceramifiable polymer 124 and an outer layer is the retaining jacket 126.

The retaining jacket 126 may also have other characteristics that contribute to the fire resistant electrical cable splice 110. The retaining jacket 126 may, for instance, be an electrically insulative polymer. The retaining jacket 126 may, for instance, be a thermally insulative polymer. The retaining jacket 126 may be heat resistant such that integrity of the retaining jacket 126 is maintained up to at least 900° F. The retaining jacket 126 may be a glass tape, which may serve to protect the ceramifiable polymer 124 from being damaged by exterior forces.

One of the purposes contemplated for the fire resistant electrical cable splice 110 is continued operation during exposure to significantly high temperatures. The fire resistant electrical cable splice 110 disclosed herein has shown the capacity to continue conducting a current between conductors 118, 120 for at least one hour while the temperature of the environment 134 is approximately 1700° F. This type of controlled environment 134 testing is designed to demonstrate the ability of the fire resistant electrical cable splice 110 to maintain operation in an actual high temperature fire situation.

Figure 3:
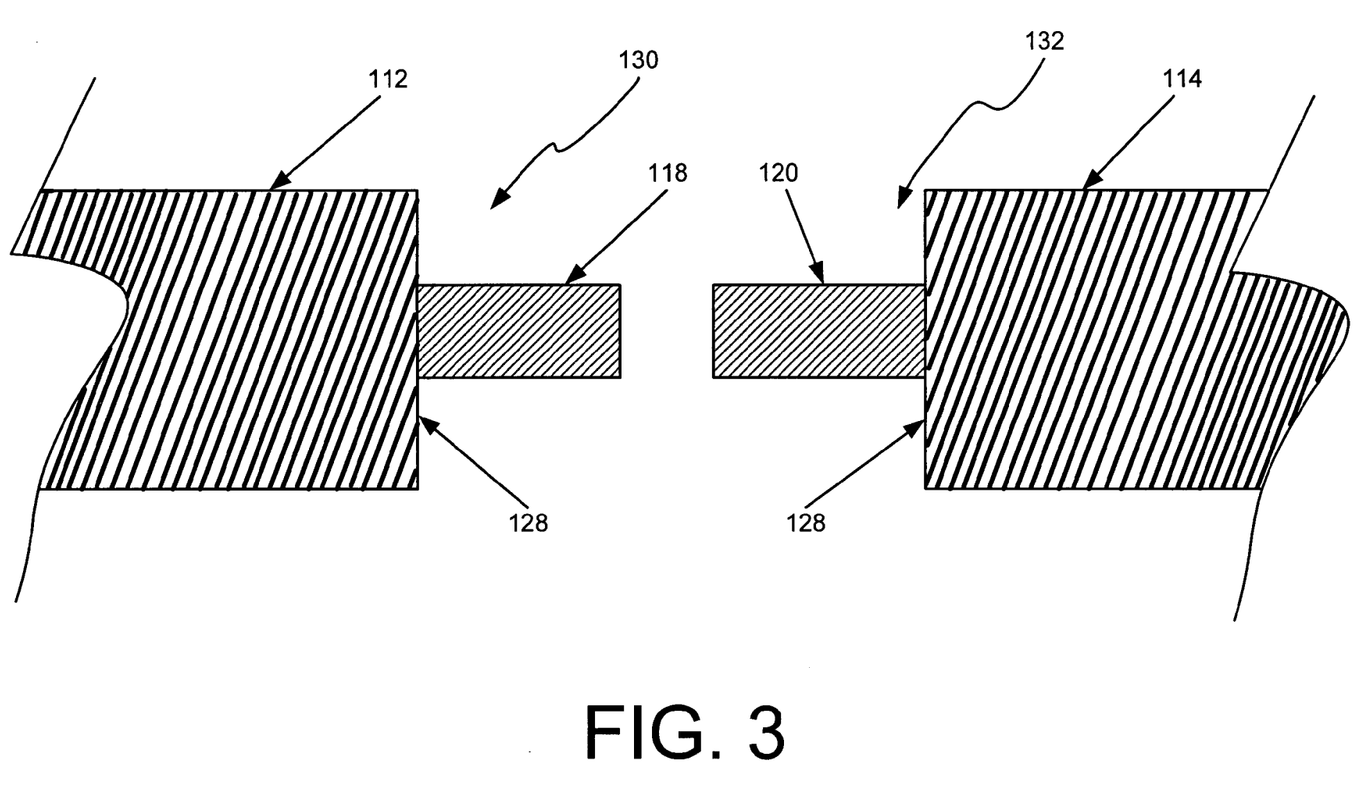
FIG. 3 is a side view of two electrical cables prepared for splicing, in accordance with a second exemplary embodiment of the invention.
Figure 4:
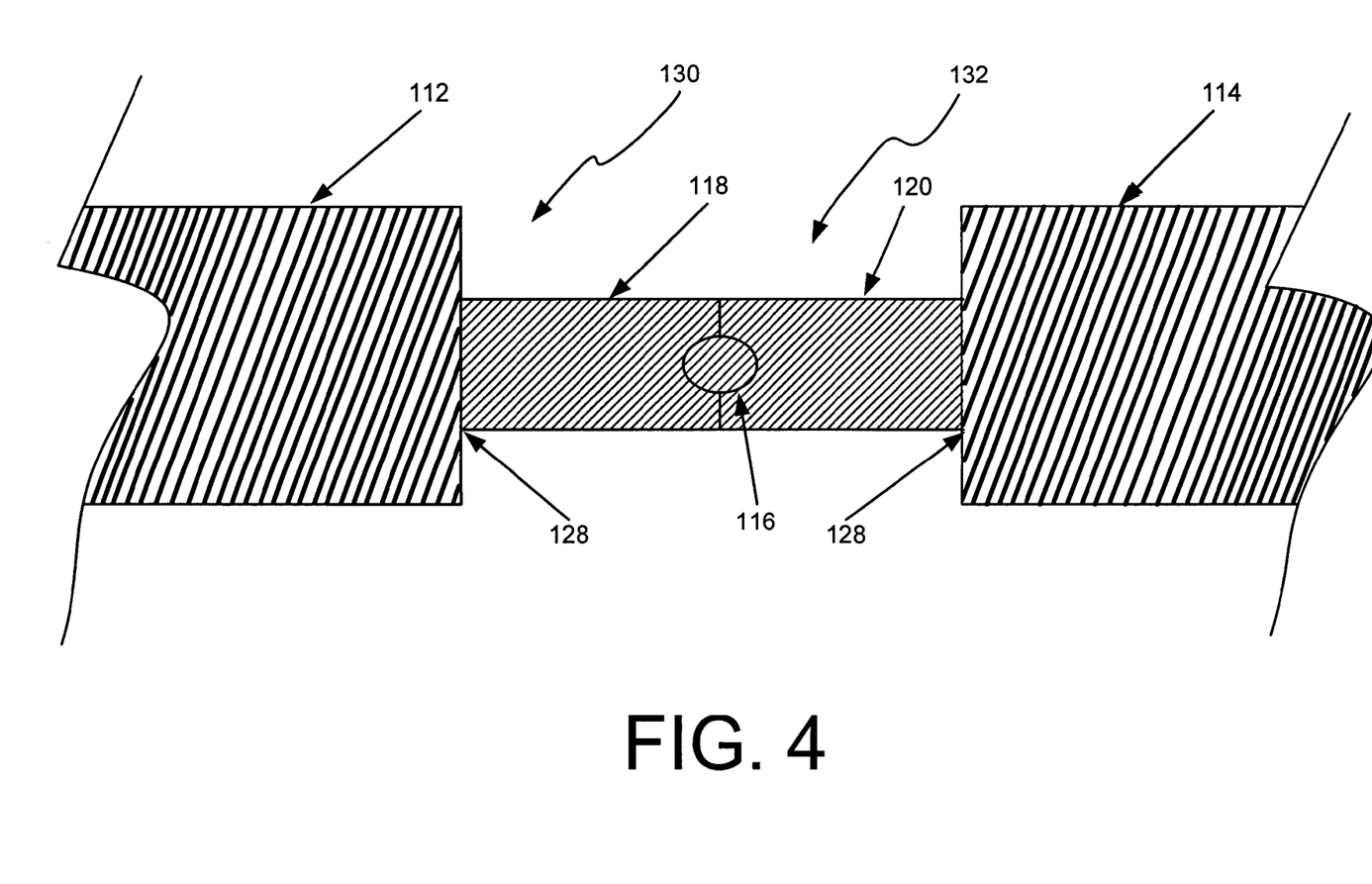
FIG. 4 is a side view of two electrical cables joined by a connection, in accordance with a second exemplary embodiment of the invention.
Figure 5:
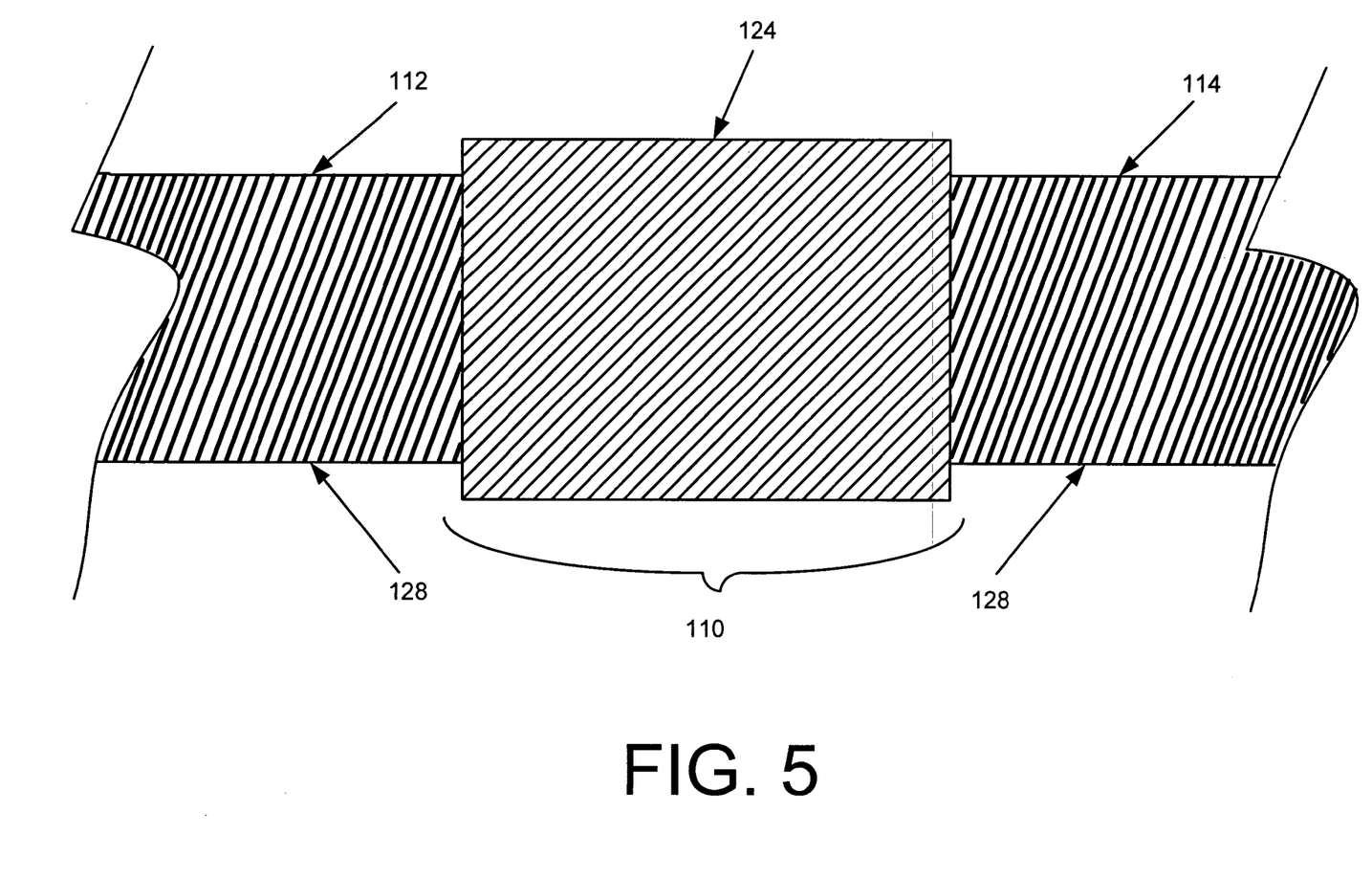
FIG. 5 is a side view of two electrical cables joined by a connection with a ceramifiable polymer applied substantially over the connection, in accordance with a second exemplary embodiment of the invention.

FIGS. 3-5 are side views of two electrical cables 112, 114 in various stages of being connected by a fire resistant electrical cable splice 110, in accordance with the second exemplary embodiment of the invention. FIG. 3 is a side view of two electrical cables 112, 114 prepared for splicing. Insulation 128 has been removed from a first conductor 118 at a first end 130 of a first electrical cable 112 and a second conductor 120 at a second end 132 of a second electrical cable 114. The insulation 128, for example, may be cut or peeled away from each conductor 118, 120, or the electrical cables 112, 114 may be prefabricated with conductors 118, 120 exposed.

FIG. 4 is a side view of two electrical cables 112, 114 joined by a connection 116. The connection 116 shown is a weld of the conductors 118, 120. The connection 116, for instance, may be formed by weld, soldering, a crimp, or a mechanical joint involving a crimp, a ring, a nut, and a bolt. All of these connections 116 are known to those having ordinary skill in the art for making an electrically conductive connection between two electrical conductors. Other connections known to those having ordinary skill in the art for making an electrically conductive connection between two electrical conductors are contemplated by and are considered to be within the scope of the present invention.

FIG. 5 is a side view of two electrical cables 112, 114 joined by a connection (not shown) with a ceramifiable polymer 124 applied substantially over the connection. The ceramifiable polymer 124 may be one of many such polymers known to those having ordinary skill in the art. The ceramifiable polymer 124 may be a ceramifiable silicone rubber. The ceramifiable polymer 124 may be applied to the connection (not visible in FIG. 5) in a tape form or using a pliable block. In tape form, the ceramifiable polymer 124 may be wrapped over the connection. In pliable block form, the ceramifiable polymer 124 may be molded over the connection. Other forms of ceramifiable polymer 124 may similarly be applied over the connection. As shown in FIG. 5, a thickness of the ceramifiable polymer 124 over the connection may be similar to a thickness of insulation 128 over the conductors 118, 120.

The connection 116 may further be stored in a ceramic block, a standoff, or an insulator (not shown). Blocks, standoffs, and insulators are known to those having ordinary skill in the art. A retaining jacket 126 (shown in FIG. 2) may also be substantially applied over the ceramifiable polymer 124. If the ceramifiable polymer 124 is heated too rapidly to significant temperatures, the ceramifiable polymer 124 may expand too quickly, causing it to crack and otherwise degrade its integrity. The blocks, standoffs, and insulators may be used to slow the rate at which the ceramifiable polymer 124 heats, limiting the possibility of damage. The retaining jacket 126 may be used to limit expansion of the ceramifiable polymer 124, reducing the possibility of cracking and degradation. The retaining jacket 126 may be a glass cloth tape known to those having ordinary skill in the art.

Figure 6:
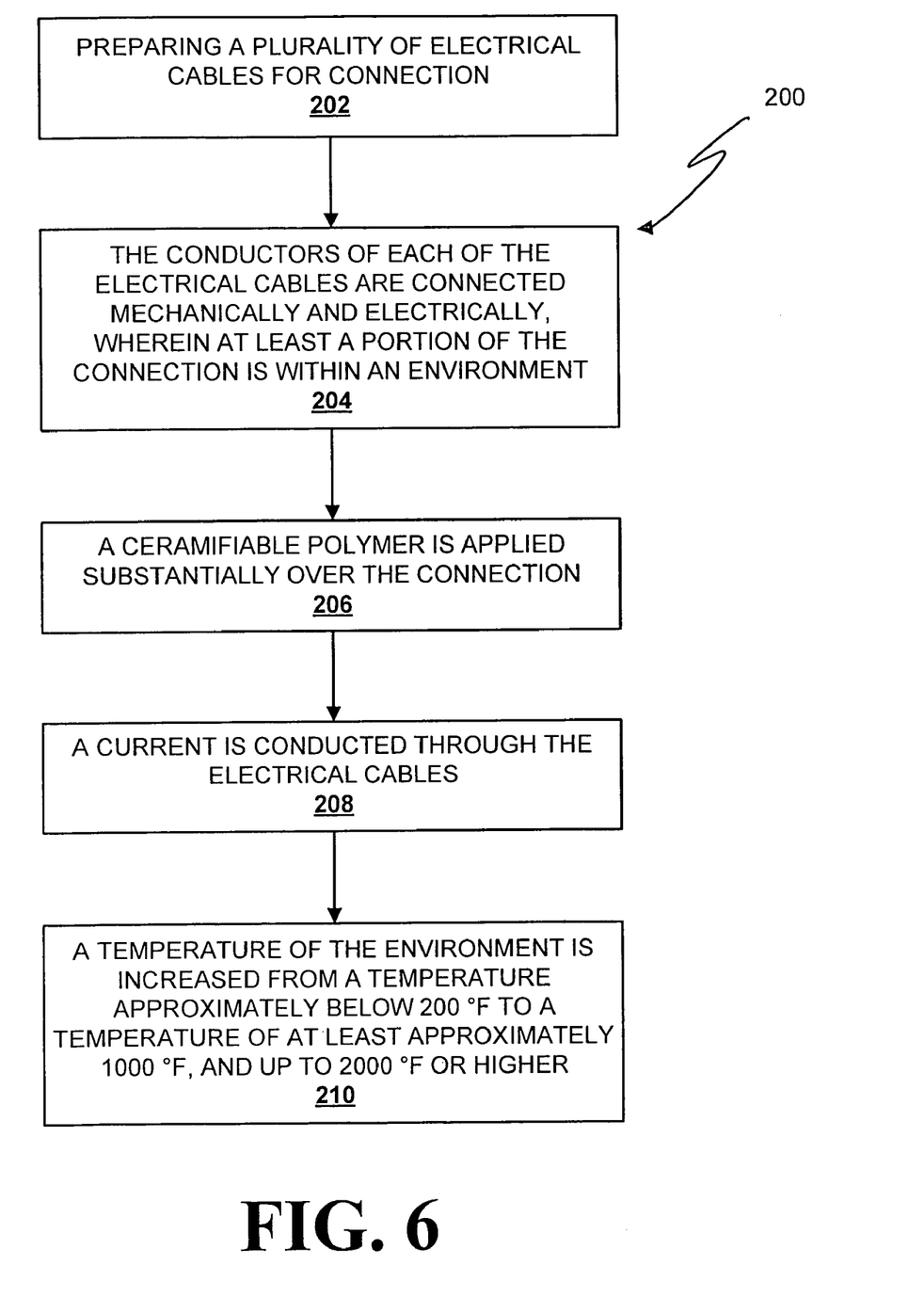
FIG. 6 is a flow chart showing the functionality and operation of a possible implementation of a method for using the fire resistant electrical cable splice, in accordance with the second exemplary embodiment of the invention.

The flow chart of FIG. 6 shows the functionality and operation of a possible implementation of a method for using the fire resistant electrical cable splice 110, in accordance with the second exemplary embodiment shown in FIG. 2. In this regard, each block represents a module, segment, or step, which comprises one or more instructions for implementing the specified function. It should also be noted that in some alternative implementations, the functions noted in the blocks might occur out of the order noted in FIG. 6. For example, two blocks shown in succession in FIG. 6 may in fact be executed non-consecutively, substantially concurrently, or the blocks may sometimes be executed in the reverse order, depending upon the functionality involved, as will be further clarified herein.

As shown in FIG. 6, a method 200 of using a fire resistant electrical cable splice 110 includes preparing a plurality of electrical cables 112, 114 for connection (block 202). Each of the electrical cables 112, 114 includes a conductor 118, 120, and at least one thermally and electrically insulating jacket 126 applied over the conductor 118, 120. The conductors 118, 120 of each of the electrical cables 112, 114 are connected mechanically and electrically, wherein at least a portion of the connection 116 is within an environment 134 (block 204). A ceramifiable polymer 124 is applied substantially over the connection 116 (block 206). A current is conducted through the electrical cables 112, 114 (block 208). A temperature of the environment 134 is increased from a temperature approximately below 200° F. to a temperature of at least approximately 1000° F., and up to 2000° F. or higher (block 210).

It should be emphasized that the above-described embodiments of the present invention are merely possible examples of implementations, simply set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

I claim:

1. A fire resistant electrical cable splice, comprising:
   at least two electrical cables;
   at least one connection, formed by at least one conductor from each of the at least two electrical cables, connected mechanically and electrically;
   an insulating polymer that is electrically nonconductive at least at temperatures above 500° F., the insulating polymer substantially applied over the connection, wherein the insulating polymer is a ceramifiable silicone rubber; and
   a retaining jacket substantially applied over the insulating polymer that allows the insulating polymer to maintain integrity in an environment of at least 1850° F.

2. The splice of claim 1, wherein the insulating polymer is at least one of the group comprising a heat shrink tube, a cold shrink tube, and a premolded splice.

3. The splice of claim 1, wherein the insulating polymer further comprises a ceramifiable polymer that will begin to ceramify at a temperature below 950° F.

4. The splice of claim 1, wherein the retaining jacket further comprises a glass cloth tape.

5. The splice of claim 4, wherein the retaining jacket is heat resistant such that integrity of the retaining jacket is maintained at least up to 900° F.

6. The splice of claim 1, wherein the conductor is electrically conductive and has a melting point above 1850° F.

7. A method of using a fire resistant electrical cable splice, the method comprising the steps of:
   preparing a plurality of fire resistant electrical cables for connection, wherein each of the electrical cables comprise:
   a conductor;
   at least one thermally and electrically insulative jacket applied over the conductor;
   mechanically and electrically connecting the conductors of each of the electrical cables, wherein at least a portion of the connection is within an environment;
   applying an insulating polymer substantially over the connection;
   applying a retaining jacket substantially over the insulating polymer;
   conducting a current through the electrical cable for at least one hour while the temperature of the environment is at least 1850° F; and
   increasing a temperature of the environment consistently from a temperature approximately below 200° F. to a temperature at least approximately 1700° F. while conducting the current through the electrical cable.

8. The method of claim 7, further comprising the step of storing the connection in one of the group consisting of a ceramic block, a standoff, or an insulator.

9. The method of claim 7, further comprising the step of wrapping a glass cloth tape substantially over the insulating polymer.

10. A method of splicing two electrical cables together within an environment, the method comprising the steps of:
    removing insulation from a first conductor at a first end of a first electrical cable and a second conductor at a second end of a second electrical cable for connection;
    mechanically and electrically joining the first conductor and the second conductor to form a connection; and
    applying an insulating polymer substantially over the connection, wherein the insulating polymer is a ceramifiable silicone rubber;
    applying a glass cloth tape substantially over the insulating polymer;
    conducting a current through the first and second electrical cables for at least one hour while the temperature of the environment is at least 1850° F.

11. The method of claim 10, further comprising storing the connection in one of the group consisting of a ceramic block, a standoff, or an insulator.

12. The method of claim 10, further comprising ceramifying the insulating polymer.

* * * * *